United States Patent [19]

Burgdorf

[11] 4,004,839

[45] Jan. 25, 1977

[54] DUAL CIRCUIT BRAKE FORCE REGULATING DEVICE

[75] Inventor: Jochen Burgdorf, Offenbach, Germany

[73] Assignee: ITT Industries, Inc., New York, N.Y.

[22] Filed: Feb. 6, 1976

[21] Appl. No.: 655,915

[30] Foreign Application Priority Data

Feb. 25, 1975 Germany .................. 2507997

[52] U.S. Cl. .................. 303/6 C; 188/151 A; 188/349; 200/82 D; 303/84 A

[51] Int. Cl.² .................. B60T 8/26

[58] Field of Search .......... 303/6 C, 6 R, 84 A, 303/11; 188/151 A, 349; 200/82 D; 340/52 C

[56] References Cited

UNITED STATES PATENTS

| | | | |
|---|---|---|---|
| 3,661,426 | 5/1972 | Tam | 303/6 C |
| 3,727,989 | 4/1973 | Keady | 303/6 C |
| 3,752,535 | 8/1973 | Wallace | 303/6 C |
| 3,804,468 | 4/1974 | Ishikawa et al. | 188/349 X |
| 3,866,984 | 2/1975 | Seip | 188/349 X |

*Primary Examiner*—Trygve M. Blix
*Assistant Examiner*—Douglas C. Butler
*Attorney, Agent, or Firm*—John T. O'Halloran; Thomas M. Marshall

[57] ABSTRACT

The brake force regulator device is for a dual circuit brake system in which the function of the regulator is suppressed if an uncontrolled brake circuit fails. A locking piston is provided which serves this purpose as well as at the same time to release a differential pressure warning signal should one of the two circuits fail. The advantages achieved with the arrangement disclosed are that only a small amount of pressure fluid is drawn from the intact brake circuit in case of the failure of the other circuit so that the locking piston performs a dual function.

10 Claims, 1 Drawing Figure

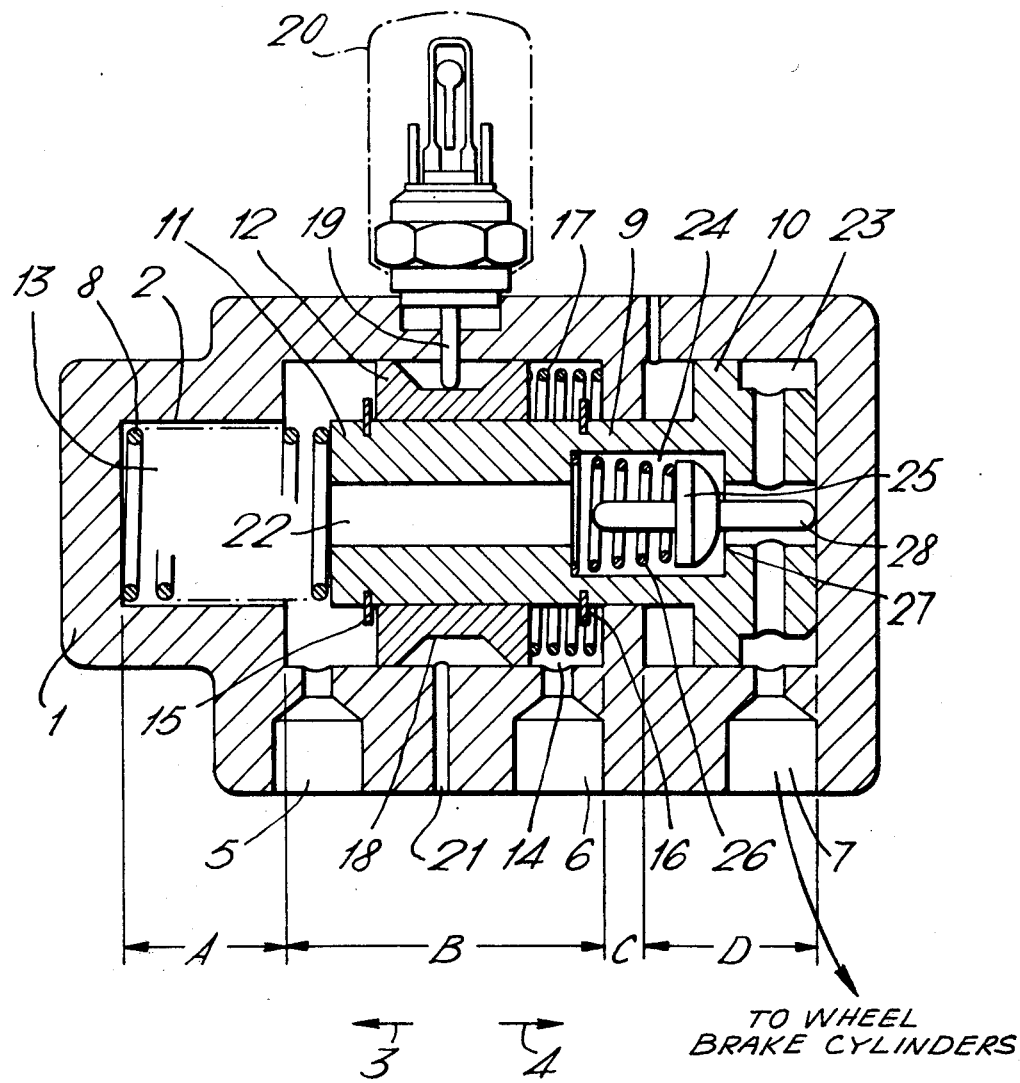

DUAL CIRCUIT BRAKE FORCE REGULATING DEVICE

BACKGROUND OF THE INVENTION

1. Field of the Invention

Brake force regulators for dual circuit brake systems.

2. Prior Art

Brake force regulators for dual circuit brake systems are known in the prior art, specifically from German published application DT-OS No. 2,261,341. In that prior art brake force regulator a locking piston is disposed coaxially with a stepped piston in a second bore in the housing and extends with a push rod into a regulator chamber positioned in front of the larger of the stepped end surface piston. In the closing direction of that brake force regulator, the locking piston is exposed to the pressure of the fluid supplied to the wheel brake cylinders and in the opening direction, to the pressure in the second brake circuit. In that device when both brake circuits are intact the locking piston is held in abutment against a housing stop disposed in the closing direction of the brake force regulator.

It has been found that if the brake force regulator of the published German application is in use a system and the second brake circuit fails, pressure from the first brake circuit will act on the stepped piston and the locking piston in the closing direction of the brake force regulator. The stepped piston is thereby shifted into its end position lying in the closing direction. The locking piston follows this movement, pushes a closure member open with the aid of its push rod so that pressure fluid continues to flow freely between a control chamber communicating with the first circuit and a regulator chamber in communication with the wheel brake cylinders. The desired effect, namely to cut the brake force regulator out of operation in the event of failure of the second brake circuit, is thus fully accomplished. However, it is a disadvantage, in the device of the published German application, that the regulator chamber, which becomes enlarged owing to the displacement of the stepped piston, receives the brake pressure fluid from the first intact brake circuit. Similarly, pressure fluid from the first intact brake circuit is required for shifting the locking piston. This is of particular importance since, in the case of a brake circuit failure, the brake pedal travel for actuating the master cylinder is, in all cases, larger than normal. This effect is further intensified if the intact brake circuit draws more pressure fluid than is the case when both circuits are intact.

It is also known that as a check the proper functioning of the brake circuits, to supply differential pressure warning switches which are frequently included in dual circuit brake systems. The effect of such a switch is that a warning signal is given to the vehicle operator whenever a brake circuit has failed. It is similarly known that differential warning switches include a switch piston which is centered in a middle position and which is acted on on its opposite sides or faces by the brake circuit pressure of each of the two brake circuits. When either of the brake circuits fails the switch piston is displaced by the action of the pressure in the intact circuit which releases a differential pressure warning indication to signal the operator that one of the brake circuits has failed. It will be seen therefore that the prior art differential warning switches, in the event of failure of a brake circuit, also require, for their operation, additional fluid under pressure from the intact brake circuit. Thus when equipped with a dual circuit brake system having the brake force regulator known from the German published application DT-OS No. 2,261,341 and including a differential pressure warning switch of the type described above, additional pressure fluid is required for displacing the stepped piston, the locking piston and the switch piston of the differential pressure warning switch if one of the brake circuits has failed. Even though the individual amounts of brake fluid required are relatively small, when they are added together they cause a considerable loss in pedal travel and may even involve exhaustion of the master cylinder.

Furthermore in the brake force regulator described in the published application the locking piston is in no position to assume the function of the switch piston for the differential pressure warning switch since, in the normal case, the locking piston is not held in a middle position but instead rests against a stop on the housing. Therefore, if the first brake circuit fails, the locking piston is unable to move, which would make it impossible for it to operate to give rise to a differential pressure warning. Furthermore, in the prior art device, it is not possible to center the locking piston in a middle position since it is acted on by different pressures above the switchover point of the brake force regulator and it would always release the differential pressure warning signal. Furthermore, in the event of the failure of the first brake circuit such an arrangement would still need pressure fluid for displacing the stepped piston and additional pressure fluid for displacing the locking piston.

SUMMARY OF THE INVENTION

The object of this invention is to improve upon the brake force regulator of the type referred to above so that in the event of failure of the second brake circuit no additional pressure fluid is required from the first brake circuit except that required to displace the locking piston in the brake force regulator and furthermore permits the use of the locking piston for activating the differential pressure warning switch.

In the brake force regulator of this invention the aforegoing object is achieved because the locking piston is acted on in the opening direction by the uncontrolled pressure in the first brake circuit and in the closing direction by the pressure of the second brake circuit so that the axially displaceability of the locking piston from a middle position in the opening direction is limited by the stepped piston. Furthermore a tripping pin is supported against the locking piston in a radial direction to activate a differential pressure warning switch by means of two ramps provided adjacent a mid-section of exterior surface of the locking piston. In the device of this invention the full pressure from the two brake circuits always acts on the locking piston. Thus it is centered in a middle position without the risk of a faulty indication above the switchover point of the brake force regulator. Furthermore the arrangement of parts of the brake force regulator of this invention, including the limitaton on the axial displaceability of the locking piston on by the stepped piston, is such that the stepped piston moves in the opening direction if the second brake circuit fails, thereby stopping the stepped piston in its rest position. Since the stepped piston cannot be moved in the closing direction no additional pressure fluid can be received in the regulator chamber. Therefore, in the brake force regulator embodying the invention, only a small amount of pressure fluid is required for displacing the locking piston, thereby fulfilling all necessary functions, including a differential pressure warning indication. Thus all of the functions are performed by the device of this invention and the disadvantages occurring in the prior art are thus avoided in a simple manner.

BRIEF DESCRIPTION OF THE DRAWING

The drawing illustrates a cross sectional view of the brake force regulator and differential pressure warning switch of this invention.

DESCRIPTION OF THE PREFERRED EMBODIMENT

As illustrated in the FIGURE, a housing 1 is provided with a stepped bore 2 forming sections A, B, C and D. In order to understand more clearly the operation of the device the arrow 3 is pointing in the direction of closing and the arrow 4 points in the opening direction of the brake force regulator illustrated. A fluid port 5 is connected to and communicates with the first brake circuit (not shown) and the opening through fluid port 5 terminates at the end of bore section B lying in the closing direction. Fluid port 6 communicates with and is connected to the second brake circuit (not shown) terminates at the end of bore section B in the opening direction. A third fluid port 7 terminates at the end of bore section D lying in the opening direction. Fluid port 7 serves to connect the regulator of this invention to wheel brake cylinders of the controlled wheels.

It will be noted that the diameters of the individual bore sections A through D are different, with the diameter of bore section B corresponding to the diameter of bore section D in the illustrated embodiment. The diameter of bore section C is smaller than diameters of bore sections B and D. The diameter of bore section A is unimportant as regards the functioning of the illustrated brake force regulator since it merely accommodates a governing spring 8 resting with one end against housing 1 and with the other end against stepped piston 9. Stepped piston 9 has an end portion 10 which is in sealed and sliding engagement with bore section D. Stepped piston 9 further has an extension 11 extending from the end portion 10 in the closing direction into bore B through bore C wherein it is sealed in a sliding relationship and guided thereby. Sealed to and slidable on extension 11, there is provided a locking piston 12 which is designed as an annular piston and is in turn in sealing and sliding engagement with bore section B of housing 1. This arrangement defines, in bore sections A and B a control chamber 13 and an annular chamber 14.

The axially displaceability of locking piston 12 relative to extension 11 of the stepped piston 9 is limited by stops 15 and 16 which may be circlips mounted in grooves on extension 11 of the stepped piston 9. A centering spring 17 is accommodated in annular chamber 14 resting with one end against housing 1 and with the other end against locking piston 12 thereby biasing locking piston 12 against stop 15 in the closing direction.

On its outer circumferential surface, locking piston 12 has a recess 18 defined on either end by ramps extending outwardly in an inclined relationship. The recess 18 normally supports the tripping pin 19 of a differential pressure warning switch 20. The space which is formed by recess 18 is in communication with the atmosphere via an opening 21 through housing 1. In the interior of stepped piston 9 a fluid line 22 is provided which includes several channels and connects control chamber 13 with a regulator chamber 23 defined by the end portion 10 of stepped piston 9 in bore section D and communicating with fluid port 7. Fluid line 22 has an enlarged chamber 24 accommodating a closure member 25 which is biased towards its valve seat 27 by means of spring 26. Valve closure member 25 has a tappet 28 projecting through regulator chamber 23 which serves to keep it in its open position against the force of spring 26 in the event that stepped piston 9 abuts against housing 1 in the opening direction 4.

The operation of the illustrated brake force regulator embodiment of this invention is as follows:

When the braking operation is started, all of the parts are in their positions illustrated in the FIGURE. If both brake circuits are intact, pressure will begin to develop and feed pressure fluid to fluid port 5 of the first brake circuit and to fluid port 6 of the second brake circuit. In this manner the same amount of hydraulic pressure will first build up in control chamber 13 and in annular chamber 14. The pressure ratio between control chamber 13 and annular chamber 14 will continue to prevail even above the switchover point so that the locking piston 12 is always pressure balanced with both brake circuits intact, thereby imparting no force to stepped piston 9.

When the pressure starts building up, since the closure member 25 is kept in the open position, the pressure fluid flows through fluid line 22 to regulator chamber 23 and onwards to the connected wheel brake cylinders through fluid port 7. By these means the pressure in control chamber 13 acts in the opening direction in the cross-sectional area of stepped piston 9 which is determined by the extension 11, and with the fluid line 22 open, the same pressure which prevails in regulator chamber 23 will act in the closing direction on the cross sectional area of the stepped piston which is determined by end portion 10. Thus when the switchover point is reached the stepped piston will be displaced in the known manner in the closing direction against the control force acting in the opening direction which is exerted by governing spring 8 until closure member 25 closes off fluid member 22 from which moment on the pressure in regulator chamber 23 will be reduced in accordance with the stepped piston's surface ratio of extension 11 to end portion 10, before being fed to the connected wheel brake cylinders. Locking piston 12 follows this relatively small control movement of stepped piston 9 owing to the centering spring 17. However, this spring is so dimensioned that it is not able to displace locking piston 12 beyond the mid-section of recess 18 in respect of tripping pin 19. When dimensioning the brake force regulator properly, the control movement of the stepped piston 9 will be so small that no large displacement stroke of the locking piston 12 will occur in this case. It is to be understood that in the normal case that substantially the same pressure prevails in control chamber 13 and annular chamber 14 so that the locking piston 12 is pressure balanced.

In the event the first brake circuit fails, no pressure fluid will be fed to fluid port 5 and consequently to control chamber 13 so that no pressure will build up there. In this case pressure fluid will be fed to annular chamber 14 through fluid port 6 thereby acting on the locking piston 12 in the closing direction of the brake force regulator which causes it to be displaced in the closing direction (arrow 3) together with stepped piston 9. By virtue of the ramp limiting recess 18 in the opening direction the tripping pin 19 is thus shifted radially outward and activates differential warning switch 20 to provide a warning signal indicating brake circuit failure signal. As a result of the displacement of stepped piston 9 in the closing direction which occurs in this case, closure member 25 will also close fluid line 22. As has been pointed out above this is unimportant since in the event of the failure of the first brake circuit, pressure cannot build up in regulator chamber 23 and the wheel brake cylinders connected thereto.

In the event that the second brake circuit fails, annular chamber 14 will remain unpressurized. As a result of the pressure developed in control chamber 13 by the first brake circuit, locking piston 12 is displaced in the opening direction of the brake force regulator supporting itself, after having released the pressure differential warning signal, against stop 15 on stepped piston 9 in the opening direction. In this manner the force acting on stepped piston 9 in the opening direction originates not only from the governing spring 8 but also from the locking piston 12. In this particular instance the cross-sectional area of locking piston 12 which faces control chamber 13 and that of extension 11 can be regarded as one surface. In the embodiment illustrated in the FIGURE, that surface is equal to the surface of end portion 10 which is acted on by pressure in regulator chamber 23 in the closing direction. Thus, as long as the same pressure prevails in control chamber 13 and regulator chamber 23, the hydraulic forces are balanced. As a consequence of the control force exerted by governing spring 8 on stepped piston 9 in the opening direction, stepped piston 9 remains in its illustrated position so that fluid line 22 cannot be closed by closure member 25. This ensures free fluid flow between control chamber 13 and regulator chamber 23 in the event of failure of the second brake circuit. Thus it results that always the same pressures build up in regulator chamber 23. In this specific instance, the brake force regulator is thus de-activated by locking piston 12 which has simultaneously released the differential pressure warning signal.

It should be noted that in the brake force regulator of this invention the control force acting in the stepped piston 9 and determining the switchover point may of course be generated by a force which depends on the axle load. Furthermore it is not necessary for the outer diameter of locking piston 12 to correspond to the diameter of end portion 10 of stepped piston 9. It is only essential that the sum of the forces acting in the opening direction obtained from the control force and hydraulic force acting on extension 11 and locking piston 12 is larger than the hydraulic force acting in regulator chamber 23 on end portion 10 of stepped piston in the closing direction.

It will be seen that there is a particular advantage in the brake force regulator of the FIGURE in that the locking piston 12 is defined as an annular piston disposed in a sealed sliding relationship between the stepped piston and the bore section B of housing 1 and defining, together with stepped piston 9, a control chamber 13 communicating with the first brake circuit and an annular chamber 14 communicating with the second brake circuit, with the stop 16 on the stepped piston 9 in the annular chamber 14 limiting the axial displacement of the locking piston 12 in the opening direction. Thus, the stop 16 effectively positions the locking piston 12 limiting the displacement of the locking piston 12 in the opening direction. This provides for a particularly compact arrangement of the brake force regulator of this invention. In order to accomodate the locking piston 12, no additional cylinder space needs to be provided which would then have to be connected to the brake circuits through suitable lines.

It is furthermore a particular advantage that the stop 15 provided on the step piston 9 within control chamber 13 limits the displacement of the locking piston 12 in the closing direction. Thus the centering spring 17 disposed between the locking piston 12 and the housing 1 in bore section B keeps the locking piston 12 in its normal operating position against stop 15. Furthermore, by providing the spool shaped cross-section to locking piston 19 there are two ramps for operating the tripping pin 19 of differential pressure warning switch 20. Because of this design, the mid-section between the two ramps of locking piston 12 which supports tripping pin 19, requires only one centering spring 17 which holds the locking piston 12 in its predetermined position relative to stepped piston 9, which position is defined by the stop 15. The normal movement of control of the stepped piston 9 which is also followed by movement of the locking piston 12 will not cause a differential pressure warning indication because the tripping pin 19 is always supported on the mid-section of locking piston 12. If the first brake circuit fails, as described above, the stepped piston 9 will be displaced in the closing direction together with the locking piston 12. This is of no real concern since in this instance the first brake circuit and its related components are depressurized. Furthermore, in the design illustrated, the stops 15 and 16 are provided by machining circumferential grooves on stepped piston 9 and positioning circlips therein. This is particularly advantageous in regards to manufacture of the device illustrated since it eliminates the need for further steps on stepped piston 9 and the reduced diameter of stepped piston 9 and the grooves for stops 15 and 16 can be machined in a continuous operation. Furthermore, the arrangement of parts as illustrated simplifies assembly in an advantageous manner.

It is another advantage of the device illustrated that the space defined between the seals of the locking piston 12 and the bore section B is connected to atmosphere through channel 21. This arrangement ensures that any damage to a seal on the locking piston will be immediately noticed by the vehicle operator through the differential pressure warning indication which will be released, and this avoids the situation occurring that such a failure, in combination with another fault of the brake system, would cause a total failure of the brake system.

While this invention has been described in connection with a particular embodiment it will be apparent that the inventive subject matter can be modified without departing from the scope of the appended claims.

What is claimed is:

1. A brake force regulator for a dual circuit brake system having a housing including:
    an axially displaceable stepped piston for closing a fluid connection through said housing between a first brake circuit and at least one wheel brake cylinder which is acted on by the pressure in said first brake circuit and by a control force, both of which act on said stepped piston in the opening direction and wherein said stepped piston is acted on in the closing direction by the pressure supplied to the wheel brake cylinder;

an axially displaceable locking piston carried in a sealed, sliding relationship by said stepped piston within and in a sealed sliding association with said housing, said housing including a control chamber containing pressure fluid which acts on the locking piston in the opening direction being supplied by the uncontrolled pressure in said first brake circuit and an annular chamber for pressure fluid which acts on said locking piston in the closing direction being supplied by the pressure in said second brake circuit;

means on said stepped piston for limiting the axial displaceability of said locking piston from a middle position in the opening direction;

said locking piston's exterior surface having an annular recess formed from an intermediate mid-section and two ramp portions on either side thereof; and a pressure differential warning switch associated with said housing having a tripping pin positioned through said housing to engage the mid-section of said locking piston in a radial direction when said locking piston is in its normal position on said stepped piston and to cause actuation of said tripping pin when said locking piston is displaced in either the opening direction or in the closing direction because of the failure of pressure in one of said brake circuits.

2. The brake force regulator of claim 1 wherein a stop is provided on said stepped piston within said annular chamber which limits the displacement of said locking piston in the opening direction.

3. The brake force regulator of claim 2, wherein a second stop is provided on said stepped piston within said control chamber for limiting the movement of displacement of said locking piston in the closing direction and further including in said annular chamber a centering spring positioned between said locking piston and said housing.

4. The brake force regulator as set forth in claim 3 wherein said stepped piston has circumferential grooves in which are mounted circlips forming said stops limiting the axial movement of said locking piston.

5. The brake force regulator as set forth in claim 1, wherein said annular recess defined between the sealed portions of locking piston in relation to said housing is connected to atmosphere through an opening formed in said housing.

6. A brake force regulator for a dual circuit brake system having:

a housing including a plurality of bores formed therein and fluid connecting passageways therein communicating with said bores for first and second brake circuits and for communicating with brake cylinders of the regulated wheels;

an axially displaceable stepped piston positioned in a sealed, sliding relationship within the bores of said housing and supported and guided by one of the bores having a reduced cross-section for closing the fluid connection between said first brake circuit and at least one of the brake cylinders of the regulated wheels and forming, on one end, a part of one end of a control chamber with one of the bores in said housing which is in communication through said fluid connection to said first brake circuit and having a control force means therein whereby said one end of said stepped piston is acted on in the opening direction by both the pressure supplied by said first brake circuit and said control force means, forming with another bore in said housing on the other end of said stepped piston, a regulator chamber in communication with at least one of the brake cylinders of said regulated wheels, a fluid passageway formed through said stepped piston communicating pressure fluid between said control and regulator chambers having closure means positioned therein for keeping said passageway open when both said brake circuits are intact and for closing said passageway when said first brake circuit fails;

an axially displaceable locking piston, carried by said stepped piston intermediate its ends in a sealed sliding relationship thereto and positioned within a bore in said housing in a sealed sliding relationship thereto, having an intermediate portion of the exterior surface thereof forming an annular recess between the interior of said bore and the exterior of said intermediate portion and having ramp portions on both ends thereof, one end of said locking piston forming together with said one end of said stepped piston one end of said control chamber and the other end of said locking piston forming one wall of an annular chamber which is in communication with said second brake circuit, a centering spring means for said locking piston carried in said annular chamber positioned between said other end of said locking piston and the other wall of said annular chamber, which other wall is defined by a portion of said housing's reduced cross-section bore in which said stepped piston is supported and guided;

stop means carried by said stepped piston for limiting the axial displacement of said locking piston; and differential pressure warning switch means associated with said housing having actuating means contacting said intermediate portion of said locking piston when both brake circuits are intact and operated by said ramp portions to cause a warning signal when said locking piston is displaced because of a failure in either of said brake circuits.

7. The brake force regulator of claim 6 wherein said stop means for limiting the axial movement of said locking piston in the opening direction is carried on a portion of said stepped piston in said annular chamber.

8. The brake force regulator of claim 6 wherein said stop means for limiting the axial movement of said locking piston in the closing direction is carried on a portion of said stepped piston in said control chamber.

9. The brake force regulator of claim 6 wherein said stop means for limiting the axial movement of said locking piston in the opening direction is carried on a portion of said stepped piston in said annular chamber and wherein said stop means for limiting the axial movement of said locking piston in the closing direction is carried on a portion of said stepped piston in said control chamber.

10. The brake force regulator of claim 6 further including a passageway in said housing which communicates said annular recess between the bore of said housing and the intermediate portion of said locking piston to the atmosphere.

* * * * *